United States Patent

Takahashi et al.

[11] Patent Number: 5,902,765
[45] Date of Patent: May 11, 1999

[54] SOLID CATALYST COMPONENTS FOR OLEFIN POLYMERIZATION

[75] Inventors: Hirotoshi Takahashi, Ohita; Yasushi Kuroda, Kawasaki; Masaki Fushimi; Shintaro Inazawa, both of Ohita, all of Japan

[73] Assignee: Japan Polyolefins Co., Ltd., Tokyo, Japan

[21] Appl. No.: 08/799,231

[22] Filed: Feb. 14, 1997

[30] Foreign Application Priority Data

Feb. 16, 1996 [JP] Japan ................................. 8-028801

[51] Int. Cl.⁶ .............................. C08F 4/654; C08F 4/649
[52] U.S. Cl. .................... 502/127; 502/126; 526/123.1; 526/124.2
[58] Field of Search .............. 526/123.1, 124.2; 502/126, 127

[56] References Cited

U.S. PATENT DOCUMENTS 4,293,673 10/1981 Hamer et al. .............................. 526/88
4,663,299 5/1987 Chadwick et al. ...................... 502/126
5,703,181 12/1997 Tashiro et al. .......................... 502/126

FOREIGN PATENT DOCUMENTS

0361494B1 4/1990 European Pat. Off. .
0633270A1 11/1995 European Pat. Off. .

*Primary Examiner*—Peter F. Kulkosky
*Attorney, Agent, or Firm*—Dilworth & Barrese

[57] ABSTRACT

Solid catalyst components for olefin polymerization which comprise a solid carrier components comprising a solid substance having the general formula $$MgX_2 \cdot (E)_n \qquad (1)$$

wherein X is a halogen atom, E is a monoether compound and n is 0.01~4, at least a portion of said E being replaced by an eletron donative compound different from said monoether compound (E), and a titanium compound and these catalyst components can produce an olefin polymer having a high stereoregularity in a high polymer yield per unit of a catalyst component in olefin polymerization.

4 Claims, No Drawings

SOLID CATALYST COMPONENTS FOR OLEFIN POLYMERIZATION

BACKGROUND

1. Field of the Invention

This invention relates to a solid catalyst component for olefin polymerization. More particularly, it is concerned with a solid catalyst component for olefin polymerization which can produce an olefin polymer with a high stereoregularity in a high yield of a polymer per unit of a solid catalyst component, a process for the production of the same and a process for the production of a polyolefin using the same.

2. Prior Art

It is well-known that Ziegler-Natta solid catalyst components bearing a titanium halide on a carrier such as magnesium chloride and the like have been used together with an organometallic compound and the like for olefin polymerization.

For producing a solid catalyst component, there has been suggested, for example, a process wherein magnesium chloride is dissolved in an ether compound such as tetrahydrofuran and the like and contacted with a titanium compound(Japanese Patent Kokai Application No. 151603/1982). Another known process is to contact a copulverized product of an ether compound such as tetrahydrofuran and the like with a titanium compound.

(Japanese Patent Kokai Application No. 89210/1986). When the solid catalyst component obtained according to these processes is used for olefin polymerization, there have been presented the problems of an insufficient polymerization activity, a low stereoregularity of a polymer and others.

For improving stereoregularity of a polymer, there have been suggested a process using a solid catalyst component containing an electron donor such as a phthalic acid ester and the like together with a silicon compound(Japanese Patent Kokai Application No. 811/1983), a process using a solid catalyst component containing an electron donor such as a diether compound and the like together with a silicon compound (Japanese Patent Kokai Application No. 336503/1991) and others. When the solid catalyst components obtained according to these processes are used for olefin polymerization, a large amount of a catalyst residue is retained in the polymer because of a low yield of a polymer per unit of the catalyst component and there is presented the problem in which the catalyst residue results in adverse influence such as deterioration of the polymer and so on.

Accordingly, there has been desired a solid catalyst which may give an improved yield of a polymer per unit of a catalyst component and decrease a catalyst residue capable of producing an an adverse influence such as deterioration of a polymer and so on.

SUMMARY OF THE INVENTION

It is a primary object of this invention to provide a solid catalyst component for olefin polymerization which may give a higher yield of a polymer per unit of the solid catalyst component as compared with the prior art catalysts and produce an olefin polymer having a high stereoregularity, a process for the production of the same and a process for the production of a polyolefin using the same.

We have made various studies to improve the aforementioned problems and, as a result, have completed the present invention.

More particularly, according to one aspect of this invention, this invention relates to a solid catalyst component for olefin polymerization which comprises (A) a solid carrier component comprising (a) a solid substance having the general formula $$MgX_2 \cdot (E)_n \qquad (1)$$

wherein X is a halogen atom, E is a monoether compound and n is 0.01~4, at least a part of said E being replaced by (b) an electron donative compound different from said monoether compound (E); and (B) a titanium compound.

According to another aspect of this invention, this invention relates to a process for the production of a solid catalyst component for olefin polymerization which comprises producing a solid substance having the above general formula (1) by the reaction of a magnesium halide compound with a monoether compound using an inert medium which does not dissolve said solid substance having the above general formula (1), treating said solid substance with an electron donative compound other than said monoether compound and, if desired, a Lewis acid compound to form a solid catalyst component wherein at least a part of said E in the above general formula (1) is replaced by said electron donative compound (b) and then bring said solid carrier component thus obtained into contact with a titanium compound.

According to still another aspect of this invention, this invention relates to a process for the production of a polyolefin which comprises polymerizing at least one of olefins in the presence of a catalyst which comprises said solid catalyst component, an organoaluminum compound and, if desired, an electron donative compound.

By using the present solid catalyst component, there may be produced an olefin polymer having a high stereoregularity in a high yield per unit of the solid catalyst component not yet achieved in the prior art.

DETAILED DESCRIPTION OF THE INVENTION

This invention will be explained in greater detail below.

It is, first of all, essential for the solid carrier component (A) in the present solid catalyst component to prepare said solid substance having the general formula (1).

In the general formula (1), Mg means a magnesium atom, X is a halogen atom selected from the group consisting of fluorine, chlorine, bromine and iodine and may comprise one or more of the halogen atoms, X's may be the same or different and E is a monoether compound.

The solid substance (a) having the general formula (1) corresponds to a solid complex composed of a magnesium halide compound and a monoether compound.

As the magnesium halide compounds, there may be mentioned, for example, magnesium fluoride, magnesium chloride, magnesium bromide, magnesium iodide and the like. In particular, magnesium dichloride is preferable.

The magnesium halide may also be prepared from a halogen-containing compound and a magnesium-containing compound.

The solid substance (a) may be prepared according to a process wherein a magnesium halide compound is brought into contact with a monoether compound (represented by E) or a process wherein a halogen-containing compound, a magnesium-containing compound and a monoether compound(E) are concurrently brought into contact to eventually obtain a final product as a solid state.

As the monoether compounds, there may be preferably mentioned a compound having the general formula (2) or (3)

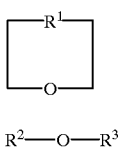
(2)

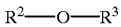

$R^2$—O—$R^3$  (3)

wherein $R^1$ is a divalent hydrocarbyl group and $R^2$ and $R^3$ are a monovalent hydrocarbyl group. Particularly, as the groups for $R^1$, $R^2$ and $R^3$, there may be preferably mentioned a saturated aliphatic hydrocarbyl group having 10 or less carbon atoms and an aromatic hydrocarbyl group having 6~10 carbon atoms. Illustrative examples may include, for example, methyl, ethyl, propyl, butyl, hexyl, octyl, phenyl, tolyl, etc.

Specific examples of monoether compounds include, for example, methyl ether, ethyl ether, isopropyl ether, butyl ether, anisole, phenetole, guaiacol, tetrahyrofuran, tetrahydropyrane, 2-methyltetrahydrofuran, 2,2,5,5-tetramethylhydrofuran, tetrahydropyrane-2-methanol, etc. and ethyl ether, butyl ether, tetrahydrofuran and tetrahydropyrane are more preferable. The monoether compounds may be used alone or in admixture with two or more.

Specific examples of halogen-containing compounds include, for example, phosphorus chloride such as phosphorus trichloride, phosphorus pentachloride and the like, chlorine-containing alcohols such as 2,2,2-trichloroethanol and the like, halogen-containing hydrocarbons, fluorine, chlorine, bromine, iodine, hydrogen fluoride, hydrogen chloride, hydrogen bromide, hydrogen iodide and the like. Halogen-containing hydrocarbons are preferred. Specific examples of halogen-containing hydrocarbons include, for example, dichloromethane, chloroform, 1,1-dichloroethane, 1,1,1-trichloroethane, 1,2-dichloroethane, 1,2-dichloropropane, 1,3-dichloropropane, acrylic chloride, tert-butyl chloride, 1,1-dimethyl-propane, 1-methyl-1-chloro-1-ethylpropane, methyl bromide, 1,2-dibromoethane, methyl iodide, etc. 1,2-Dichloroethane, 1,2-dichloropropane, acrylic chloride and tert-butyl chloride are preferable.

Specific examples of magnesium-containing compounds include, for example, magnesium alkoxides such as magnesium ethoxide, magnesium isopropoxide and the like, magnesium carboxylates such as magnesium laurate, magnesium stearate and the like, alkyl magnesium such as butylethyl magnesium, metallic magnesium and the like. These compounds may be used alone or in admixture with two or more. Metallic magnesium is preferable. Metallic magnesium may be used in a usual commercially available form and it may also be used in a powdery, ribbon or chip form.

A charged amount of each component when a halogen-containing compound and a monoether compound (E) are contacted each other is as depicted below.

An amount of the monoether compound (E) to be charged is in the range of 0.0001~100, more preferably 0.001~10, in terms of a molar ratio to the magnesium atom included in the magnesium halide compound.

A contact temperature is usually in the range of –80~200° C., preferably –20~100° C.

It is essential for the present invention to obtain the complex component having the general formula (1) in a solid state. Therefore, it is required that an inert medium in which the complex component having the general formula (1) is substantially insoluble in or after contacting as described above shall be present, and, particularly, it is preferable that the inert medium should be present in contacting. Specific examples of inert media include, for example, aliphatic hydrocarbons such as pentane, hexane, heptane, octane, decane, etc. or aromatic hydrocarbons such as benzene, toluene, xylene, ethylbenzene, etc.

It is desirable to remove an excess monoether compound after contacting all components. The excess monoether compound as referred to herein is meant to be a monoether compound which could not form a complex with a magnesium halide compound after contacting under the above conditions. Illustratively stated, it is referred to a monoether compound which may be separated and removed from the solid substance (1) by treating with a medium which has a low affinity to the solid substance (a) thus produced as stated below and a high affinity to the monoether compound. Specific examples of the medium having a low affinity to the magnesium halide compound and a high affinity to the monoether compound include, for example, the same aliphatic hydrocarbons as used for the above contacting medium such as pentane, hexane, heptane, octane, decane, etc. or aromatic hydrocarbons such as benzene, toluene, xylene, ethylbenzene, etc. In this case, a temperature to be applied in the treatment with an inert medium is in the range of –50~200° C., preferably 0~50° C.

Thus, the solid substance having the general formula (1) is obtained as described above.

The numerical value for n in the general formula (1) is in the range of 0.0001~4 and the range of 0.01~4 is particularly preferred. If the n value is more than 4, it becomes difficult to maintain the solid state sufficient to achieve the effects of this invention.

A molar ratio of the monoether compound (E) to one mole of magnesium atom in the solid substance (a) is determined by measuring contents of the monoether compound (E) and magnesium atom in said solid substance as disclosed below. An amount of the monoether compound (E) is determined by dissolving the solid substance in an alcohol and then subjecting to a gas chromatography, while an amount of magnesium atom is determined by dissolving the solid substance in dilute sulfuric acid and using an ICP emission analysis apparatus.

According to this invention, there is produced a solid carrier component (A) is prepared by contacting the solid substance (a) obtained as described above with the electron donative compound (b) to replace a part or all of the monoether compound in said substance (a) by the electron donative compound (b)

The electron donative compound (b) for replacement should be other monoether compound than that used above, while a compound having at least one of a carbonyl group, an alkoxy group and an amino group in its molecule is particularly preferred. Preferable electron donative compounds include, for example, ester compounds, alkoxyester compounds, ketoester compounds, alkoxysilane compounds, amine compounds, etc. and a compound having 2 or more alkoxy groups is particularly preferred.

Particularly preferred electron donative compounds are those compounds having 2 or more alkoxy groups and the following formulae (4), (5) and (6).

(4)

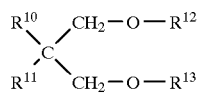

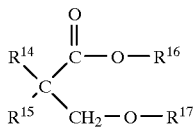

(5)

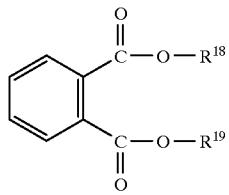

(6)

In the above formulae, $R^{10}$, $R^{11}$, $R^{14}$ and $R^{15}$ individually are a hydrogen atom or a hydrocarbyl group and $R^{12}$, $R^{13}$, $R^{16}$, $R^{17}$, $R^{18}$ and $R^{19}$ individually are a hydrocarbyl group optionally having hetero atoms. The hydrocarbyl group optionally having hetero atoms may be illustrated, for example, by an aliphatic hydrocarbyl group having 1~10 carbon atoms, an alicyclic hydrocarbyl group, a polycyclic hydrocarbyl group or a cyclic hydrocarbyl group containing hetero atoms. Specific examples of the hydrocarbyl groups include, for example, a methyl, ethyl, n-propyl, isopropyl, n-butyl, isobutyl, n-pentyl, isopentyl, cyclopentyl or cyclohexyl group and others.

Illustratively stated, the electron donative compounds may include, for example, the following compounds:

Alkoxyesters such as methyl methoxyacetate, ethyl methoxyacetate, butyl methoxyacetate, phenyl methoxyacetate, methyl ethoxyacetate, ethyl ethoxyacetate, butyl ethoxyacetate, phenyl ethoxyacetate, ethyl n-propoxyacetate, ethyl isopropoxyacetate, methyl n-butoxyacetate, ethyl isobutoxyacetate, ethyl n-hexyloxyacetate, octyl sec-hexyloxyacetate, methyl 2-methylcyclohexyl-oxyacetate, methyl 3-methoxypropionate, ethyl 3-methoxypropionate, butyl 3-methoxypropionate, ethyl 3-ethoxypropionate, dodecyl 3-ethoxypropionate, pentamethylphenyl 3-ethoxypropionate, ethyl 3-(isopropoxy)propionate, butyl 3-(isopropoxy)propionate, allyl 3-(n-propoxy)propionate, cyclohexyl 3-(n-butoxy)propionate, ethyl 3-neopentyloxypropionate, ethyl 3-(n-octyloxy)propionate, octyl 3-(2,6-dimethyldecyloxy)propionate, ethyl 4-ethoxybutyrate, cyclohexyl 4-ethoxybutyrate, octyl 5-(n-propoxy)valerate, ethyl 12-ethoxylaurate, ethyl 3-(1-indenoxy)propionate, methyl 3-methoxyacrylate, methyl 2-ethoxyacrylate, ethyl 3-phenoxyacrylate, ethyl 2-methoxypropionate, n-butyl 2-(isopropoxy)butyrate, methyl 2-ethoxyisobutyrate, phenyl 2-cyclohexyloxyisovalerate, butyl 2-ethoxy-2-phenylacetate, allyl 3-neopentyloxybutyrate, methyl 3-ethoxy-3-(o-methylphenyl)propionate, ethyl 3-ethoxy-3-(o-methylphenyl)propionate, ethyl 4-ethoxy-2-methyl-1-naphthylnonanoate, 2-methoxycyclopentanecarboxylic acid ethyl ester, 2-ethoxycyclohexanecarboxylic acid butyl ester, 3-(ethoxymethyl)tetralin-2-acetic acid isopropyl ester, 8-butoxy-decalin-1-carboxylic acid ethyl ester, 3-ethoxynorbornanecarboxylic acid methyl ester, methyl 2-(phenoxy)acetate, ethyl 3-(p-cresoxy)propionate, ethyl 4-(2-naphthoxy)butyrate, butyl 5-carvaroxyvalerate, methyl 2-phenoxypropionate, ethyl 3-(4-methylphenoxy)-2-phenylpropionate, 2-phenoxycyclohexanecarboxylic acid ethyl ester, ethyl thiophene-3-oxyacetate, 2-(2-picolinoxymethyl)cyclohexanecarboxylic acid ethyl ester, ethyl 3-furfuryloxypropionate, etc.; phthalate compounds such as dimethyl phthalate, diethyl phthalate, dipropyl phthalate, diisobutyl phthalate, diheptyl phthalate, dioctyl phthalate, dineopentyl phthalate, etc.; diether compounds such as 2,2-diisobutyl-1,3-dimethoxypropane, 2-isopropyl-2-isopentyl-1,3-dimethoxypropane, 2-(3,7-dimethyloctyl)-1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2-heptyl-2-pentyl-1,3-dimethoxypropane, 2,2-dicyclohexyl-1,3-dimethoxypropane, 2-isopropyl-2-isobutyl-1,3-dimethoxypropane, 2,2-dipropyl-1,3-dimethoxypropane, etc.; and the like. The electron donative compounds (b) may be used alone or in admixture therewith.

When the solid substance (a) is contacted with the electron donor compound (b), a charged amount of each component is usually as stated below. An amount of the electron donative compound (b) is in the range of 0.0001~100, more preferably 0.001~10, in terms of a molar ratio to the magnesium atom included in the solid substance (a).

A temperature when contacted is usually in the range of −80~200° C., more preferably 0~100° C.

In contacting all components, it is preferable as described above to use an inert medium. As the inert medium, there may be mentioned, for example, aliphatic hydrocarbons such as pentane, hexane, heptane, octane, decane, etc. or aromatic hydrocarbons such as benzene, toluene, xylene, ethylbenzene, etc.

When a part or all of the monoether compound (E) in the solid substance (a) is substituted with the electron donor compound (b) by contacting the substance (a) with the electron donative compound (b), a Lewis acid compound (c) may be also used together. Specific examples of the Lewis acid compounds include, for example, phosphorus chloride compounds such as phosphorus trichloride, phosphorus pentachloride, etc.; silicon tetrachloride; titanium chloride compounds such as titanium trichloride, titanium tetrachloride, etc.; organoaluminum compounds such as triethylaluminum, tripropylaluminum, tributylaluminum, triisobutylaluminum, trihexylaluminum, trioctylaluminum, diethylaluminum hydride, diisobutylaluminum hydride, diethylaluminum chloride, diethylaluminum bromide, ethylaluminum sesquichloride, etc.; and the like.

A charged amount of the Lewis acid compound is usually in the range of 0.1~100, more preferably 1~10. Thereafter, excess electron donor compound (b) and Lewis acid compound not incorporated into the solid carrier component are removed. This removal is usually performed by repeated washings with an inert medium.

In the solid carrier component (A) thus obtained, a molar ratio of the monoether compound (E) to the magnesium atom and a molar ratio of the electron donor compound (b) to the magnesium atom are as defined below, respectively:

$0 \leq$ a molar ratio of the monoether compound (E)/the magnesium atom <4, and $0<$ a molar ratio of the electron donative compound (b)/the magnesium atom $\leq 2$, more preferably $0 \leq$ a molar ratio of the monoether compound (E)/the magnesium atom <2, and $0<$ a molar ratio of the electron donative compound (b)/the magnesium atom $\leq 1$.

The present solid catalyst component for olefin polymerization is prepared by contacting the aforementioned solid carrier component (A) with the titanium compound (B). In regard to an amount of each component to be used, the titanium compound (B) is preferably used in the range of 0.1~1,000 moles to 1 mole of the magnesium atom included in the solid carrier component (A), particularly preferably in the range of 1~200 moles, while the electron donative compound (b) is preferably used in the range of 0.01~2 moles to 1 mole of the magnesium atom included in the solid substance (a), particularly preferably in the range of 0.1~1 moles. A temperature when contacted is usually −70~250° C., preferably in the range of 30~150° C.

As the titanium compounds which may be used in this invention, they may be illustrated by a titanium compound having the following formula (6):

$$\text{Ti(OR)}_p X_{4-p} \tag{7}$$

wherein R is a hydrocarbyl group, X is a halogen atom and p is $0 \leq p < 4$.

Specific examples of the hydrocarbyl group R include, for example, a methyl, ethyl, propyl or butyl group and the like. The halogen atom may be illustrated by fluorine, chlorine, bromine and iodine.

Specific titanium compounds include, for example, titanium tetrahalides such as titanium tetrachloride, titanium tetrabromide, titanium tetraiodide, etc., trihalogenated alkoxytitanium such as trichloromethoxy titanium, trichloroethoxy titanium, trichloro-n-butoxy titanium, tribromoisobutoxy titanium, etc., dihalogenated dialkoxy titanium such as dichlorodimethoxy titanium, dichlorodiethoxy titanium, dichlorodi-n-butoxy titanium, dibromodiisobutoxy titanium, etc., monohalogenated alkoxy titanium such as chlorotrimethoxy titanium, chlorotriethoxy titanium, chlorotri-n-butoxy titanium, bromotriisobutoxy titanium, etc., tetraalkoxy titanium such as tetramethoxy titanium, tetraethoxy titanium, tetra-n-butoxy titanium, tetraisobutoxy titanium, tetra(2-ethylhexyl)titanium, etc.

Of these titanium compound, titanium tetrahalides are preferable, particularly titanium tetrachloride. The titanium compounds may be used alone or in admixture therewith. Alternatively, it may be used after diluted with a hydrocarbon or a halogenated hydrocarbon.

In preparing the present solid catalyst component for olefin polymerization, a carrier may be used, in addition to the above components.

As the carrier, there may be used, for example, $Al_2O_3$, $SiO_2$, $B_2O_3$, MgO, CaO, $TiO_2$, ZnO, $ZnO_2$, BaO, ThO and a resin such as a styrene-divinylbenzene copolymer and the like. Of these carriers, $Al_2O_3$, $SiO_2$ and a styrene-divinylbenzene copolymer are preferable.

In the composition for the solid catalyst component for olefin polymerization prepared according to this invention, a ratio of halogen/titanium(in an atomic ratio ) is usually 2~300, preferably 20~100. A ratio of the electron donative compound/titanium (in a molar ratio ) is usually 0.05~50, preferably 0.2~5. A ratio of magnesium/titanium(in an atomic ratio ) is usually 5~200, preferably 1~100.

The catalyst system which may be used in this invention is a catalyst system which comprises a combination of the solid catalyst component (A) and the organoaluminum compound (B) and, if desired, the electron donative compound (C).

Representative examples of the organoaluminum compound (B) which may be used in this invention are represented by the following formulae (8) to (11):

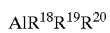  (8)

  (9)

(10)

(11)

In the above formula (8), $R^{18}$, $R^{19}$ and $R^{20}$ may be the same or different and individually represent a hydrocarbyl group having at the most 12 carbon atoms or a hydrogen atom, at least one of them being the hydrocarbyl group. In the above formula (9), $R^{21}$, $R^{22}$, $R^{23}$ and $R^{24}$ may be the same or different and individually represent a hydrocarbyl group having at the most 12 carbon atoms. In the above formulae (10) and (11), $R^{25}$ and $R^{26}$ individually represent a hydrocarbyl group having at the most 12 carbon atoms, and m is an integer of 1 or more.

Specific examples of the organoaluminum compounds of the formula (8) include, for example, a trialkyl aluminum such as triethyl aluminum, tripropyl aluminum, tributyl aluminum, triisobutyl aluminum, trihexyl aluminum, trioctyl aluminum, etc.; an alkyl aluminum hydride such as diethylaluminum hydride, dibutylaluminum hydride, etc.; and an alkylaluminum halide such as diethylaluminum chloride, diethylaluminum bromide, ethylaluminum sesquichloride, etc.

Of the organoaluminum compounds having the formula (9), typical examples thereof may include tetraethyldialumoxane, tetrabutyldialmoxane, etc.

The formulae (10) and (11) represent an alumoxane group and mean a polymer of aluminum compounds. $R^{25}$ and $R^{26}$ may include a methyl, ethyl, propyl, butyl or pentyl group and the like and a methyl or ethyl group is preferable. The value of m is preferably 1~10.

Of these organoaluminum compounds, trialkylaluminum compounds are especially preferable.

These organoaluminum compounds may be used alone or in admixture therewith.

The catalyst system which may be used in this invention comprises a solid catalyst component for olefin polymerization and an organoaluminum compound (B) and, if necessary, an electron donative compound (C).

The electron donative compounds may include an organosilicon compound containing an alkoxy group, a nitrogen-containing compound, a phosphorus-containing compound and an oxygen-containing compound.

Specific examples of the organosilicon compounds containing an alkoxy group include, for example, tetramethoxy silane, tetraethoxy silane, tetrabutoxy silane, tetraisobutoxy silane, trimethylmethoxy silane, trimethylethoxy silane, triethylmethoxy silane, triethylethoxy silane, ethylisopropyldimethoxy silane, propylisopropyldimethoxy silane, diisopropyldimethoxy silane, diisobutyldimethoxy silane, isopropylisobutyldimethoxy silane, di(tert-butyl)dimethoxy silane, tert-butylmethyldimethoxy silane, tert-butylethyldimethoxy silane, tert-butylpropyldimethoxy silane, tert-butylisopropyldimethoxy silane, tert-butylbutyldimethoxy silane, tert-butylisobutyldimethoxy silane, tert-butyl(sec-butyl)dimethoxy silane, tert-butylamyldimethoxy silane, tert-butylhexyldimethoxy silane, tert-butylheptyldimethoxy silane, tert-butyloctyldimethoxy silane, tert-butylnonyldimethoxy silane, tert-butyldecyldimethoxy silane, tert-butyl(3,3,3-trifluoromethylpropyl)dimethoxy silane, tert-butyl (cyclopentyl)dimethoxy silane, tert-butyl(cyclohexyl) dimethoxy silane, dicyclopentyldimethoxy silane, bis(2-methylcyclopentyl)dimethoxy silane, bis(2,3-dimethylcyclopentyl)dimethoxy silane, diphenyldimethoxy silane, phenyltrimethoxy silane, mesityltrimethoxy silane, ethyltrimethoxy silane, propyltrimethoxy silane, isopropyl-trimethoxy silane, butyltrimethoxy silane, isobutyl-trimethoxy silane, tert-butyltrimethoxy silane, sec-butyltrimethoxy silane, amyltrimethoxy silane, isoamyltrimethoxy silane, cyclopentyltrimethoxy silane, cyclohexyltrimethoxy silane, norbomanetrimethoxy silane, indenyltrimethoxy silane, 2-methylcyclopentyltrimethoxy silane, cyclopentyl(tert-butoxy)dimethoxy silane, isopropyl (tert-butoxy)dimethoxy silane, tert-butyl(isobutoxy) dimethoxy silane, tert-butyl(tert-butoxy)dimethoxy silane, hexyltrimethoxy silane, hexylisopropoxydimethoxy silane, hexyl(tert-butoxy)dimethoxy silane and the like.

Specific examples of the nitrogen-containing compounds include 2,6-substituted piperidines such as 2,6-diisopropylpiperidine, 2,6-diisopropyl4-methylpiperidine, N-methyl-2,2,6,6-tetramethylpiperidine, etc., 2,5-substituted azolidines such as 2,5-diisopropylazolidine, N-methyl-2,2,5,5-tetramethylazolidine, etc., substituted methylenediamines such as N,N,N',N'-tetramethylmethylenediamine, N,N,N',N'-tetraethylmethylenediamine,etc., substituted imidazolines such as 1,3-dibenzylimidazoline, 1,3-dibenzyl-2-phenylimidazoline, etc.

Specific examples of the phosphorus-containing compounds include phosphorous acid esters such as triethyl phosphite, tri-n-propyl phosphite, triisopropyl phosphite, tri-n-butyl phosphite, triisobutyl phosphite, diethyl-n-butyl phosphite, diethylphenyl phosphite, etc.

Specific examples of the oxygen-containing compounds include 2,6-substituted tetrahydrofurans such as 2,2,6,6-tetramethylhydrofuran, 2,2,6,6-tetraethylhydrofuran, etc., dimethoxymethanes such as 1,1-dimethoxy-2,3,4,5-tetrachlorocyclopentadiene, 9,9-dimethoxyfuruorene, diphenylmethoxymethane, etc., and the diether compounds represented by the formula (2).

These electron donative compounds (b) may be used alone or in admixture therewith.

In the process for the production of the present olefin polymer, it is preferable to prepolymerize an olefin onto a solid catalyst component for olefin polymerization previously. This prepolymerization is carried out by the prepolymerization of the olefin onto the solid catalyst at an amount of the olefin of usually 1~1,000 g, preferably 0.3~500 g, particularly preferably 1~200 g, per 1 g of said solid catalyst.

A concentration of the solid catalyst for the prepolymerization is desirably in the range of 0.0025~500 g, preferably 0.025~125 g, particularly preferably 0.25~50 g, per 1 liter of a solvent.

An amount of the organoaluminum compound may be usually in such a level to produce the polymer at 1~1,000 g, preferably 0.3~500 g, per 1 g of the solid catalyst. An amount of the organoaluminum compound per 1 mole of the titanium atom in the solid catalyst component may be usually about 0.1~300 moles, preferably about 0.1~100 moles, particularly preferably 1~50 moles.

In this prepolymerization, the electron donative compound (b) may be used if necessary. An amount of the electron donative compound (b) per 1 mole of the titanium atom in the solid catalyst component may be usually about 0.1~50 moles, preferably about 0.5~30 moles, particularly preferably 1~10 moles.

The prepolymerization is carried out by adding an olefin and said catalyst component to a solvent.

Specific examples of the olefin which may be used in this case include olefins having 2~20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicocene, cyclopentene, cycloheptene, norbornene, 5-methyl-2-norbornene, tetracyclododecene, 2-methyl-1,4,5,8-dimethano-1,2,3,4a,5,8,8a-octahydronaphthalene, etc.

Specific examples of the solvent which may be used in this case include, for example, aliphatic hydrocarbons such as pentane, hexane, heptane, octane, decane, dodecane, kerosene, etc., alicyclic hydrocarbons such as cyclopentane, cyclohexane, methylcyclopentane, etc., aromatic hydrocarbons such as benzene, toluene, xylene, etc., halogenated hydrocarbons such as ethylene chloride, chlorobenzene, etc., or a mixture thereof and the like. Of these solvents, aliphatic hydrocarbons may be particularly preferred. On the other hand, the prepolymerization may be carried out by using the olefin itself as a solvent or in the substantial absence of the solvent.

Reaction temperature in the prepolymerization is usually in the range of about $-20°$ C.~+100° C., preferably about $-20°$ C.~+80° C., more preferably 0° C.~+40° C. In the prepolymerization, a molecular weight regulating substances such as hydrogen and the like may be used.

In the present process for the production of an olefin polymer, specific examples of the olefin which may be used in the polymerization include, for example, olefins having 2~20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicocene, cyclopentene, cycloheptene, norbornene, 5-methyl-2-norbornene, tetracyclododecene, 2-methyl-1,4,5,8-dimethano-1,2,3,4a,5,8,8a-octahydronaphthalene, etc.

These olefins may be homopolymerized or two or more thereof may be copolymerized. Alternatively, any combination of said olefins with the following monomers may be copolymerized. Specific examples of the monomer which may be used for copolymerization include, for example, the compounds having polyunsaturated bonds such as conjugated dienes or non-conjugated dienes, for example, aromatic vinyl compounds such as styrene, allylbenzene, etc., alicyclic vinyl compounds such as vinylcyclohexane, etc., dienes such as 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, isoprene, butadiene, etc.

The present polymerization may be carried in the solution polymerization mode, suspension polymerization mode and gas phase polymerization mode. It may be carried out according to any of batch-wise, discrete and continuous methods. Moreover, polymerization may be carried out by two or more separate steps under varied reaction conditions.

When the polymerization is carried out under liquid phase reaction conditions, said solvent may be used as a reaction solvent or a liquid olefin at reaction temperature may be also used.

An amount of the solid catalyst component in the present polymerization may be usually in the range of usually 0.001~5 g, preferably 0.001~0.25 g, particularly preferably 0.0025~0.05 g per 1 liter of a polymerization volume. An amount of the organoaluminum compound per 1 mole of the titanium atom in the solid catalyst component may be usually about 1~2,000 moles, preferably about 5~500 moles.

If hydrogen is used in the present polymerization, a molecular weight of the polymer thus obtained may be modified to produce a polymer having a high melt flow index.

Polymerization temperature is set usually at about 20° C.~200° C., preferably about 50~150° C., and polymerization pressure is set usually at atmospheric pressure to 100 kg/cm$^2$, preferably about 2~50kg/cm$^2$.

The olefin polymer thus prepared may be any of a homopolymer, a random copolymer and a block copolymer.

DESCRIPTION OF SPECIFIC EMBODIMENTS

This invention will be further explained by way of the following examples and comparative examples.

Generally, all compounds used for the preparation of a solid catalyst component and polymerization (solvents, olefins, hydrogen, titanium compounds, magnesium-containing compounds, halogenated magnesium compounds and others) were in a substantially water-free state.

Determination of the content of xylene insoluble in the polymer was carried out as stated below: After 2 g of the polymer was dissolved in 200 ml of xylene at 135° C., the resulting solution was cooled to 25° C. and the polymer thus separated out was filtered. From the filtrate was distilled off the solvent by means of a rotary evaporator and after drying the residue was measured.

A mole number of the monoether compound per 1 mole of the magnesium atom in the solid substance (a) was determined by measuring the contents of the monoether compound and magnesium atom in said solid substance as explained below. Thus, a content of the monoether compound was determined by dissolving the solid substance (a) in an alcohol and analyzing by a gas chromatography. If THF was used as the monoether compound, a solution of 0.1 g of the solid substance in 2-ethylhexyl alcohol was analyzed by a gas chromatography to determine its content. The column used was Porapack QS(manufactured by Waters, an inner diameter 3 mm×2m ).

A content of magnesium atom was determined by dissolving the solid substance in dilute sulfuric acid and using ICP emission analysis apparatus (manufactured by Nippon Jarrell-ash Co.,Ltd. ).

Contents of the electron donor compound (b) in the solid carrier component (A) and the catalyst were determined by dissolving said solid carrier component (A) or the catalyst in dilute sulfuric acid, extracting an organic layer with hexane and using a gas chromatography. The column used was TC-1 (manufactured by GL Science, CP-Sil 5CB).

Amounts of the magnesium atom and titanium atom were determined by analyzing a water layer by ICP emission analysis apparatus (manufactured by Nippon Jarrell-ash Co.,Ltd. ).

Determination of MFR was carried out according to JIS K-6758-1968, Table 4, Condition No. 14.

EXAMPLE 1

Preparation of solid substance (a)

Into a 300 ml volume flask was charged 1.22 g of metallic magnesium for preparing Grignard reagent under nitrogen stream. The temperature of the content in the flask was maintained at 30° C. and then a mixture of 40 ml of hexane, 33 ml of tetrahydrofuran and 12 ml of 1,2-dichloroethane was added dropwise over 60 minutes. Reaction was carried out while stirring at 60° C. for 8 hours to obtain a solid product. The solid product was washed four timed with hexane at room temperature to afford the solid substance (a). A mole number of the tetrahydrofuran per 1 mole of the magnesium atom in the solid substance (a) was 1.7.

Solid carrier component (A)

Into a 200 ml volume flask was charged 1.5 g of said solid substance (a) under nitrogen stream. Then, 20 ml of toluene and 20 ml of titanium tetrachloride were added and, after the temperature of the flask raised to 90° C., a solution of 0.5 ml of ethyl 2-tert-butyl-3-ethoxypropionate and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.25.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 2.1% by weight, while an amount of the ethyl 2-tert-butyl-3-ethoxypropionate was 11% by weight.

Polymerization

Into a 6L inner volume autoclave under nitrogen stream were charged 3.2 mg of the solid catalyst component (A) prepared according to the above process and 310 mg of triethylaluminum and then 1,550 g of propylene and 0.48 g of hydrogen were charged.

A temperature was raised to 70° C. and propylene polymerization was carried out at that temperature for one hour. After completion of the polymerization, the gas involved in the autoclave was released. The results of polymerization are shown in Table 1.

EXAMPLE 2

Preparation of solid substance (a)

Into a 300 ml volume flask was charged 1.30 g of metallic magnesium for preparing Grignard reagent under nitrogen stream. The temperature of the content in the flask was maintained at 50° C. and then a mixture of 40 ml of hexane, 33 ml of tetrahydrofuran and 12 ml of 1,2-dichloroethane was added dropwise over 60 minutes. Reaction was carried out while stirring at 60° C. for 8 hours to obtain a solid product. The solid product was washed four timed with hexane at 60° C. to afford the solid substance (a). A mole number of the tetrahydrofuran per 1 mole of the magnesium atom in the solid substance (a) was 1.4.

Solid carrier component (A)

Into a 200 ml volume flask was charged 1.5 g of said solid substance (a) obtained by Example 1 under nitrogen stream. Then, 20 ml of toluene and 20 ml of titanium tetrachloride were added and, after the temperature of the flask raised to 90° C., a solution of 0.5 ml of ethyl 2-tert-butyl-3-ethoxypropionate and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.22.

Preparation of solid carrier component for olefin polymerization

The preparation was carried out in the same manner as described in Example 1.

An amount of the titanium atom in the catalyst was 1.9% by weight, while an amount of the ethyl 2-tert-butyl-3-ethoxypropionate was 10% by weight.

Polymerization

The polymerization was carried out in the same manner as described in Example 1.

The results of polymerization are shown in Table 1.

EXAMPLE 3

Solid carrier component (A)

Into a 200 ml volume flask was charged 1.5 g of said solid substance (a) obtained by Example 2 under nitrogen stream. Then, 20 ml of toluene and 20 ml of titanium tetrachloride were added and, after the temperature of the flask raised to 90° C., a solution of 0.5 ml of ethyl 2-isopropyl-2-isopentyl-3-propionate and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the ethyl 2-isopropyl-2-isopentyl-3-propionate per 1 mole of the magnesium atom in the solid carrier component (A) was 0.18.

Preparation of solid carrier component for olefin polymerization

The preparation was carried out in the same manner as described in Example 2.

An amount of the titanium atom in the catalyst was 2.2% by weight, while an amount of the ethyl 2-isopropyl-2-isopentyl-3-propionate was 12% by weight.

Polymerization

The polymerization was carried out in the same manner as described in Example 1.

The results of polymerization are shown in Table 1.

EXAMPLE 4

Solid carrier component (A)

Into a 200 ml volume flask was charged 1.5 g of said solid substance (a) obtained by Example 2 under nitrogen stream. Then, 20 ml of toluene and 20 ml of titanium tetrachloride were added and, after the temperature of the flask raised to 90° C., a solution of 0.5 ml of 2-isopropyl-2-isopentyl 1,3-dimethoxypropane and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the 2-isopropyl-2-isopentyl 1.3-dimethoxypropane per 1 mole of the magnesium atom in the solid carrier component (A) was 0.09.

Preparation of solid carrier component for olefin polymerization

The preparation was carried out in the same manner as described in Example 2.

An amount of the titanium atom in the catalyst was 1.9% by weight, while an amount of the 2-isopropyl-2-isopentyl 1,3-dimethoxypropane was 12.1% by weight.

Polymerization

The polymerization was carried out in the same manner as described in Example 1.

The results of polymerization are shown in Table 1.

EXAMPLE 5

Solid carrier component (A)

Into a 200 ml volume flask was charged 1.5 g of said solid substance (a) obtained by Example 2 under nitrogen stream. Then, 20 ml of toluene and 20 ml of titanium tetrachloride were added and, after the temperature of the flask raised to 90° C., a solution of 0.5 ml of 2,2-diisobutyl-1,3-dimethoxypropane and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the 2,2-diisobutyl-1.3-dimethoxypropane per 1 mole of the magnesium atom in the solid carrier component (A) was 0.14.

Preparation of solid carrier component for olefin polymerization

The preparation was carried out in the same manner as described in Example 2.

An amount of the titanium atom in the catalyst was 2.2% by weight, while an amount of the 2,2-diisobutyl-1,3-dimethoxypropane was 8.4% by weight.

Polymerization

The polymerization was carried out in the same manner as described in Example 1.

The results of polymerization are shown in Table 1.

EXAMPLE 6

Solid carrier component (A)

Into a 200 ml volume flask was charged 1.5 g of said solid substance (a) obtained by Example 2 under nitrogen stream. Then, 20 ml of toluene and 20 ml of titanium tetrachloride were added and, after the temperature of the content in the flask was raised to 90° C., a solution of 0.5 ml of diisobutyl phthalate and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the diisobutyl phthalate per 1 mole of the magnesium atom in the solid carrier component (A) was 0.30.

Preparation of solid carrier component for olefin polymerization

The preparation was carried out in the same manner as described in Example 2.

An amount of the titanium atom in the catalyst was 2.1% by weight, while an amount of the diisobutyl phthalate was 13.4% by weight.

Polymerization

The polymerization was carried out in the same manner as described in Example 1.

The results of polymerization are shown in Table 1.

COMPARATIVE EXAMPLE 1

Solid carrier component (A)

Into a 300 ml volume flask was charged 1.5 g of anhydrous magnesium chloride under nitrogen stream. Then, 20 ml of toluene and 20 ml of titanium tetrachloride were added and, after the temperature of the content in the flask was raised to 90° C., a solution of 0.5 ml of ethyl 2-tert-butyl-3-ethoxypropionate and 5ml of toluene was added dropwise over 5 minutes. The resulting mixture was stirred at 110° C. for 2 hours. Thereafter, the solid product was filtered off at 90° C. and washed twice with toluene at 90° C.

An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.30.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 2.1% by weight, while an amount of the ethyl 2-tert-butyl-3-ethoxypropionate was 13.4% by weight.

Polymerization

The polymerization was carried out in the same manner as described in Example 1.

The results of polymerization are shown in Table 1.

COMPARATIVE EXAMPLE 2

Preparation of liquid component corresponding to solid substance (a)

Into a 300 ml volume flask was charged 1.22 g of metallic magnesium for preparing Grignard reagent under nitrogen stream. The temperature of the content in the flask was maintained at 30° C. and then a mixture of 40 ml of hexane, 33 ml of tetrahydrofuran and 12 ml of 1,2-dichloroethane was added dropwise over 60 minutes. Reaction was carried out while stirring at 60° C. for 8 hours to obtain a liquid product. A mole number of the tetrahydrofuran per 1 mole of the magnesium atom in the liquid carrier component was 5.2.

Preparation of solid carrier component (A)

Into a 300 ml volume flask was charged 3.5 g of said slurry component under nitrogen stream. Then, 20 ml of toluene and 20 ml of titanium tetrachloride were added and, after the temperature of the content in the flask was raised to 90° C., a solution of 0.4 ml of ethyl 2-tert-butyl-3-ethoxypropionate and 5 ml of toluene was added dropwise over 5 minutes. The resulting mixture was stirred at 100° C. for 2 hours. Thereafter, the solid product was filtered off at 90° C. and washed twice with toluene at 90° C.

An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.27.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 1.8% by weight, while an amount of the ethyl 2-tert-butyl-3-ethoxypropionate was 12.2% by weight.

Polymerization

The polymerization was carried out in the same manner as described in Example 1.

The results of polymerization are shown in Table 1.

EXAMPLE 7

Preparation of solid substance (a)

Into a 500 ml volume flask was charged 4.78 g of anhydrous magnesium chloride and 142 ml of tetrahydrofuran under nitrogen stream. The content of the flask was heated under reflux condition for 6 hours to form a homogeneous solution. After cooling the homogeneous solution thus prepared to 0° C., 300 ml of hexane was added to obtain a solid product. The solid product was washed four timed with hexane at room temperature to afford the solid substance (a). A mole number of the tetrahydrofuran per 1 mole of the magnesium atom in the solid substance (a) was 1.7.

Preparation of solid carrier component (A)

Into a 200 ml volume flask was charged 1.5 g of said solid substance (a) under nitrogen stream. Then, 20 ml of toluene and 20 ml of titanium tetrachloride were added and, after raised to 90° C., a solution of 0.5 ml of ethyl 2-tert-butyl-3-ethoxypropionate and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.08.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component (A).

An amount of the titanium atom in the catalyst was 1.9% by weight, while an amount of the ethyl 2-tert-butyl-3-ethoxypropionate was 9.6% by weight.

Polymerization

The polymerization was carried out in the same manner as described in Example 1.

The results of polymerization are shown in Table 1.

EXAMPLE 8

Preparation of solid substance (a)

Into a 500 ml volume flask was charged 4.78 g of anhydrous magnesium chloride and 142 ml of tetrahydrofuran under nitrogen stream. The content in the flask was heated under reflux condition for 6 hours to form a homogeneous solution. After cooling the homogeneous solution thus prepared to 0° C., 300 ml of hexane was added to obtain a solid product. The solid product was washed four timed with hexane at room temperature to afford the solid substance (a). A mole number of the tetrahydrofuran per 1 mole of the magnesium atom in the solid substance (a) was 1.7.

Preparation of solid carrier component (A)

Into a 200 ml volume flask was charged 1.5 g of said solid substance (a) under nitrogen stream. Then, 20 ml of toluene and 20 ml of titanium tetrachloride were added and, after the temperature of the content in the flask was raised to 90° C., a solution of 0.5 ml of 2,2-diisobutyl-1,3-dimethoxypropane and 5 ml of toluene was added dropwise over 5 minutes. The resulting mixture was stirred at 110° C. for 2 hours. Thereafter, the solid product was filtered off at 90° C. and washed twice with toluene at 90° C.

A portion of the product was sampled and dried up for analysis of components. An amount of the tetrahydrofuran in the solid carrier component (A) was below the detection limit of the gas chromatography. A mole number of the 2,2-diisobutyl-1,3-dimethoxypropane per 1 mole of the magnesium atom in the solid carrier component (A) was 0.12.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 1.6% by weight, while an amount of the 2,2-diisobutyl-1,3-dimethoxypropane was 12.2% by weight.

Polymerization

The polymerization was carried out in the same manner as described in Example 1.

The results of polymerization are shown in Table 1.

EXAMPLE 9

Preparation of solid substance (a)

The solid substance (a) was prepared in the same manner as described in Example 1 except that 34 ml of tetrahydropyrane was used as an ether compound instead of the tetrahydrofuran. A mole number of the tetrahydrofuran per 1 mole of the magnesium atom in the solid substance (a) was 1.6.

Preparation of solid carrier component (A)

The solid carrier component (A) was prepared in the same manner as described in Example 1.

An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.11.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 2.0% by weight, while an amount of the ethyl 2-tert-butyl-3-ethoxypropionate was 13.0% by weight.

Polymerization

The polymerization was carried out in the same manner as described in Example 1.

The results of polymerization are shown in Table 1.

EXAMPLE 10

Preparation of solid substance (a)

The solid substance (a) was prepared in the same manner as described in Example 1 except that 42 ml of butyl ether was used as an ether compound instead of the tetrahydrofuran. A mole number of the butyl ether per 1 mole of the magnesium atom in the solid substance (a) was 2.2.

Preparation of solid carrier component (A)

The solid carrier component (A) was prepared in the same manner as described in Example 1.

An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.11.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium, atom in the catalyst was 2.2% by weight, while an amount of the ethyl 2-tert-butyl-3-ethoxypropionate was 12.7% by weight.

Polymerization

The polymerization was carried out in the same manner as described in Example 1.

The results of polymerization are shown in Table 1.

EXAMPLE 11

Preparation of solid substance (a)

The solid substance (a) was prepared in the same manner as described in Example 1 except that 42 ml of diethyl ether was used as an ether compound instead of the tetrahydrofuran. A mole number of the butyl ether per 1 mole of the magnesium atom in the solid substance (a) was 1.8.

Preparation of solid carrier component (A)

The solid carrier component (A) was prepared in the same manner as described in Example 1.

An amount of the diethyl ether in the solid carrier component (A) was below the detection limit. A mole number of the ethyl 2-tert-butyl-3-ethoxypropionate per 1 mole of the magnesium atom in the solid carrier component (A) was 0.11.

Preparation of solid carrier component for olefin polymerization

A mixture of the said solid carrier component with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 1.9% by weight, while an amount of the ethyl 2-tert-butyl-3-ethoxypropionate was 11.4% by weight.

Polymerization

The polymerization was carried out in the same manner as described in Example 1.

The results of polymerization are shown in Table 1.

EXAMPLE 12

Preparation of solid substance (a)

The solid substance (a) was prepared in the same manner as described in Example 1 except that 17 ml of tert-butyl chloride was used as a halogenated compound instead of the 1,2-dichloroethane. A mole number of the butyl ether per 1 mole of the magnesium atom in the solid substance (a) was 1.7.

Preparation of solid carrier component (A)

The solid carrier component (A) was prepared in the same manner as described in Example 1.

An amount of the tetrahydrofuran in the solid carrier component (A) was below the detection limit of the gas chromatography. A mole number of the ethyl 2-tert-butyl-3-ethoxypropionate per 1 mole of the magnesium atom in the solid carrier component (A) was 0.11.

Preparation of solid carrier component for olefin polymerization

A mixture of the said solid carrier component (A) with 20 ml of toluene and 20 ml of titanium tetrachloride was stirred at 110° C. for 2 hours. The solid product thus obtained was filtered off at 90° C. and washed with hexane at room temperature to afford a solid catalyst component (A).

An amount of the titanium atom in the catalyst was 2.0% by weight, while an amount of the ethyl 2-tert-butyl-3-ethoxypropionate was 12.1% by weight.

Polymerization

The polymerization was carried out in the same manner as described in Example 1.

The results of polymerization are shown in Table 1.

EXAMPLE 13

Preparation of solid substance (a)

The solid substance (a) was prepared in the same manner as described in Example 1 except that 17 ml of tert-butyl chloride was used as a halogenated compound instead of the 1,2-dichloroethane. A mole number of the butyl ether per 1mole of the magnesium atom in the diethyl ether was 1.7.

Preparation of solid carrier component (A)

Into a 200 ml volume flask was added dropwise over 5 minutes 1.5 g of said solid substance (a) obtained by Example 8, 20 ml of toluene and a solution of 0.5 ml of 2,2-diisobutyl-1,3-dimethoxypropane and 5 ml of toluene under nitrogen stream. The resulting mixture was stirred at 110° C. for 2 hours. Thereafter, the solid product was filtered off at 90° C. and washed twice with toluene at 90° C.

An amount of the 2,2-diisobutyl-1,3-dimethoxypropane in the solid carrier component (A) was below the detection limit of the gas chromatography. A mole number of the 2,2-diisobutyl-1,3-dimethoxypropane per 1 mole of the magnesium atom in the solid carrier component (A) was 0.11.

Preparation of solid carrier component for olefin polymerization

A mixture of the said solid carrier component (A) with 20 ml of toluene and 20 ml of titanium tetrachloride was stirred at 110° C. for 2 hours. The solid product thus obtained was filtered off at 90° C. and washed with hexane at room temperature to afford a solid catalyst component.

An amount of the titanium atom in the catalyst was 2.1% by weight, while an amount of the 2,2-diisobutyl-1,3-dimethoxypropane was 12.1% by weight.

Polymerization

The polymerization was carried out in the same manner as described in Example 1.

The results of polymerization are shown in Table 1.

EXAMPLE 14

Preparation of solid carrier component (A)

To a 200 ml volume flask was added dropwise over 5 minutes 1.5 g of said solid substance (a) obtained by Example 8, 20 ml of toluene and a solution of 0.5 ml of 2,2-diisobutyl-1,3-dimethoxypropane and 5 ml of toluene under nitrogen stream. The resulting mixture was stirred at 110° C. for 2 hours. Thereafter, the solid product was filtered off at 90° C. and washed twice with toluene at 90° C.

An amount of the 2,2-diisobutyl-1,3-dimethoxypropane in the solid carrier component (A) was below the detection limit of the gas chromatography. A mole number of the 2,2-diisobutyl-1,3-dimethoxypropane per 1 mole of the magnesium atom in the solid carrier component (A) was 0.11.

Preparation of solid carrier component for olefin polymerization

Under nitrogen stream, to a 200 ml flask were added the said solid carrier component (A) obtained as described in Example 13, 20 ml of toluene, 20 ml of titanium tetrachloride and 0.5 ml of 2,2-diisobutyl-1,3-dimethoxypropane and the resulting mixture was stirred at 110° C. for 2 hours. The solid product thus obtained was filtered off at 90° C. and 20 ml of toluene and 20 ml of titanium tetrachloride were again added. The resulting mixture was stirred at 110° C. for 2 hours. The solid product thus obtained was filtered off at 90° C. washed with hexane at room temperature to afford a solid catalyst component (A).

An amount of the titanium atom in the catalyst was 2.2% by weight, while an amount of the 2,2-diisobutyl-1,3-dimethoxypropane was 8.7% by weight.

Polymerization

The polymerization was carried out in the same manner as described in Example 1.

The results of polymerization are shown in Table 1.

COMPARATIVE EXAMPLE 3

Preparation of solid substance (a)

The substance was prepared in the same manner as described in Example 1.

Preparation of solid carrier component (A)

The component was prepared in the same manner as described in Example 1.

Preparation of solid carrier component for olefin polymerization

A mixture of the said solid carrier component (A) with 20 ml of toluene was stirred at 110° C. for 2 hours. The solid product thus obtained was filtered off at 90° C. and washed with hexane at room temperature to afford a solid catalyst component (A).

An amount of the titanium atom in the catalyst was 3.8% by weight, while an amount of the ethyl 2-tert-butyl-3-ethoxypropionate was 13% by weight.

Polymerization

The polymerization was carried out in the same manner as described in Example 1.

The results of polymerization are shown in Table 1.

TABLE 1

| Example No. | Monoether Compound (E) | Number of n in solid substance (a) | Electron donative compound (b) | Applied amount of solid catalyst component (A) | Activity (g-PP/g-catalyst h) | Xylene Insolbules (%) | MFR (g/10 min.) |
|---|---|---|---|---|---|---|---|
| Ex. 1 | Tetrahydrofuran | 1.7 | Ethyl 2-t-butyl-3-ethoxypropionate | 3.5 | 65,000 | 98.0 | 22.3 |
| Ex. 2 | Tetrahydrofuran | 1.4 | Ethyl 2-t-butyl-3-ethoxypropionate | 3.9 | 71,000 | 97.9 | 24.0 |
| Ex. 3 | Tetrahydrofuran | 1.4 | Ethyl 2-isopropyl-2-isopentyl-3-ethoxy-propinate | 3.4 | 48,100 | 98.4 | 41.1 |
| Ex. 4 | Tetrahydrofuran | 1.4 | 2-isopropyl-2-isopentyl-1,3- | 3.3 | 68,000 | 96.8 | 36.4 |

TABLE 1-continued

| Example No. | Monoether Compound (E) | Number of n in solid substance (a) | Electron donative compound (b) | Applied amount of solid catalyst component (A) | Activity (g-PP/g-catalyst h) | Xylene Insolbules (%) | MFR (g/10 min.) |
|---|---|---|---|---|---|---|---|
| Ex. 5 | Tetrahydrofuran | 1.4 | 2,2-diisobutyl-1,3-dimethoxypropane | 3.3 | 54,200 | 97.9 | 42.6 |
| Ex. 6 | Tetrahydrofuran | 1.4 | Diisobutyl phthalate | 5.4 | 46,700 | 98.5 | 28.2 |
| Comp. Ex. 1 | — | 0.0 | Ethyl 2-t-butyl-3-ethoxypropionate | 4.6 | 3,100 | 96.6 | 34.3 |
| Comp. Ex. 2 | Tetrahydrofuran | 5.2 | Ethyl 2-t-butyl-3-ethoxypropionate | 3.8 | 4,400 | 84.0 | 380.0 |
| Ex. 7 | Tetrahydrofuran | 1.7 | Ethyl 2-t-butyl-3-ethoxypropionate | 3.9 | 55,700 | 97.7 | 26.0 |
| Ex. 8 | Tetrahydrofuran | 1.7 | 2,2-diisobutyl-1,3-dimethoxypropane | 4.4 | 67,000 | 98.2 | 47.1 |
| Ex. 9 | Tetrahydrofuran | 1.6 | Ethyl 2-t-butyl-3-ethoxypropionate | 4.6 | 62,300 | 97.0 | 36.7 |
| Ex. 10 | Butyl ether | 2.2 | Ethyl 2-t-butyl-3-ethoxypropionate | 3.6 | 52,900 | 96.8 | 44.5 |
| Ex. 11 | Diethyl ether | 1.6 | Ethyl 2-t-butyl-3-ethoxypropionate | 3.7 | 87,200 | 97.4 | 21.7 |
| Ex. 12 | Tetrahydrofuran | 1.7 | Ethyl 2-t-butyl-3-ethoxypropionate | 5.1 | 76,700 | 98.7 | 23.3 |
| Ex. 13 | Tetrahydrofuran | 1.7 | 2,2-diisobutyl-1,3-dimethoxypropane | 3.8 | 81,000 | 98.1 | 30.9 |
| Ex. 14 | Tetrahydrofuran | 1.7 | 2,2-diisobutyl-1,3-dimethoxypropane | 4.2 | 82,400 | 98.3 | 26.3 |
| Comp. Ex. 3 | Tetrahydrofuran | 1.7 | Ethyl 2-t-butyl-3-ethoxypropionate | 3.3 | 58,000 | 93.1 | 36.0 |

As demonstrated above, an olefin polymer having a high stereoregularity can be prepared in a high yield of a polymer per unit of a solid catalyst component by replacing at least a portion of a monoether compound in a solid halogenated magnesium-monoether complex previously formed from a monoether compound.

What is claimed is:

1. A solid catalyst component for olefin polymerization prepared by the process which comprises:

reacting a halogenated magnesium compound corresponding to the general formula $MgX_2$ wherein X is a halogen atom with a monoether compound (E) selected from the group consisting of tetrahydrofuran, butyl ether and diethyl ether, wherein the mole ratio of monoether compound (E) to magnesium atom included in the halogenated magnesium compound is in the range of 0.0001 to 100 to form a solid substance; and treating the solid substance with an electron donative compound (b) having two or more alkoxy groups represented by the general formula (4), (5) or (6)

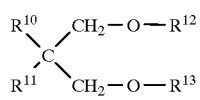

(4)

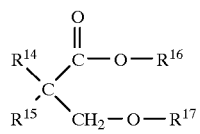

(5)

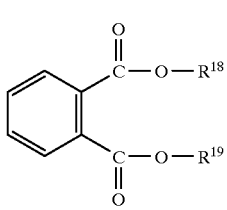

(6)

wherein $R^{10}$, $R^{11}$, $R^{14}$ and $R^{15}$ individually are a hydrogen atom or a hydrocarbyl group optionally containing a hetero atom and $R^{12}$, $R^{13}$, $R^{16}$, $R^{17}$, $R^{18}$ and $R^{19}$ individually are hydrocarbyl group optionally containing a hetero atom and bringing the solid substance which has been treated with the electron donative compound (b) into contact with titanium.

2. The solid catalyst component of claim 1 wherein the treatment of the solid substance with the electron donative compound (b) is carried out in the presence of a Lewis acid compound.

3. The solid catalyst component of claim 1 wherein the electron donative compound is selected from the group consisting of ethyl 2-t-butyl-3-ethoxypropionate, ethyl 2-isopropyl-2-isopentyl-3-ethoxypropionate, 2-isopropyl-2-isopentyl-1, 3-dimethoxypropane, 2, 2-diisobutyl-1, 3-dimethoxy propane and diisobutylphthalate.

4. The solid catalyst component of claim 1 wherein the monoether compound is tetrahydrofuran.

* * * * *